(12) United States Patent
Go et al.

(10) Patent No.: US 6,601,689 B2
(45) Date of Patent: *Aug. 5, 2003

(54) MANUFACTURING SYSTEM

(75) Inventors: Jong-chul Go, Suwon (KR); Ki-bum Kim, Suwon (KR); Song-woo Cheon, Suwon (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,019

(22) Filed: Sep. 15, 1998

(65) Prior Publication Data

US 2002/0000362 A1 Jan. 3, 2002

(30) Foreign Application Priority Data

Nov. 14, 1997 (KR) .................................... P1997-60015

(51) Int. Cl.[7] .............................................. B65G 47/24
(52) U.S. Cl. .................... 198/414; 198/465.1; 198/448
(58) Field of Search ................................. 198/357, 447, 198/448, 414, 465.1–465.3, 580, 399, 951; 29/33 P

(56) References Cited

U.S. PATENT DOCUMENTS

| | | | | | |
|---|---|---|---|---|---|
| 2,640,580 A | * | 6/1953 | De Burgh | ................. | 198/465.2 |
| 3,223,225 A | * | 12/1965 | Clark et al. | ................. | 198/357 |
| 3,625,103 A | * | 12/1971 | Giatti | ................. | 198/951 |
| 3,642,158 A | * | 2/1972 | Koennecke et al. | ..... | 198/465.2 |
| 3,844,402 A | * | 10/1974 | Hayashi | ................. | 198/465.1 |
| 4,411,354 A | * | 10/1983 | Thibault et al. | ......... | 198/465.1 |
| 4,552,260 A | * | 11/1985 | Teagno et al. | ........... | 198/465.1 |
| 4,671,402 A | * | 6/1987 | Inoue | ....................... | 198/465.3 |
| 4,739,607 A | * | 4/1988 | Annas et al. | ............ | 198/465.1 |
| 5,143,198 A | * | 9/1992 | Hale et al. | .................. | 198/414 |
| 5,205,026 A | * | 4/1993 | Sticht | ....................... | 198/465.2 |

FOREIGN PATENT DOCUMENTS

| | | |
|---|---|---|
| GB | 0 463 878 | 1/1992 |
| JP | 52-116979 | 9/1977 |
| JP | 4-140219 | 5/1992 |

* cited by examiner

Primary Examiner—Joseph E. Valenza
(74) Attorney, Agent, or Firm—Burns, Doane, Swecker & Mathis, L.L.P.

(57) ABSTRACT

Disclosed is a manufacturing system comprising a plurality of cell conveyers being supplied with a variety of pallets and products through an input section thereof, on which the products are firstly assembled; a main conveyer whereto the firstly assembled products are conveyed from said cell conveyers in a state that the firstly assembled products are loaded on the pallet, on which the products are finally assembled; and a return conveyer for returning the pallets to the input section of the cell conveyers after assembly process of the product is completed on the main conveyer. The pallets are supplied into the input section of the cell conveyers and then returned to the input section of the cell conveyers through the main conveyer and the return conveyer. The variety of products are firstly assembled on the cell conveyers respectively and then conveyed to the main conveyer to be finally assembled. The variety of products are output through an output section of the main conveyer. Thus, variety of products are manufactured simultaneously in one manufacturing system.

1 Claim, 18 Drawing Sheets

MANUFACTURING SYSTEM

BACKGROUND OF THE INVENTION

1. Field of the Invention

The present invention relates to a manufacturing system, and more particularly to a product manufacturing system capable of simultaneously manufacturing a variety of products.

2. Description of the Prior Art

Industrial products such as microwave ovens, refrigerators, and other similar appliances are generally manufactured on a linear conveyer system.

On the linear conveyer system, the components are supplied onto a moving conveyer according to the assembly order and then assembled in order until a complete product is produced at the final section of the conveyer.

In such a linear conveyer system, since the method for assembling and treating the product is minutely divided, one kind of product can be efficiently manufactured by skilled workers.

However, such a conventional linear conveyer system has a shortcoming that only one kind of product can be manufactured with one manufacturing system. Accordingly, in order to manufacture many kinds of products, additional assembly lines should be installed, or the manufacturing system itself has to be varied according to the product it manufactures. Consequently, a lot of money and time are wasted on the equipment and its installation operation, so manufacturing productivity is low in comparison with the investment thereto. Moreover, when the equipment is changed, it cannot manufacture the product that has been produced before, so the flexibility in producing products decreases and it is hard to meet the variation of the required amount of the products.

SUMMARY OF THE INVENTION

The object of the present invention is to provide a manufacturing system capable of manufacturing a variety of products simultaneously.

To achieve the above object, the manufacturing system of the present invention comprises a plurality of cell conveyers being supplied with a variety of pallets and products through an input section thereof, the conveyer on which the products are firstly assembled; a main conveyer whereto the firstly assembled products are conveyed from the cell conveyers in a state that the firstly assembled products are loaded on the pallet, the main conveyer on which the products are finally assembled; and a return conveyer for returning the pallets to the input section of the cell conveyers after assembly process of the product is completed on the main conveyer.

The pallets are supplied into the input section of the cell conveyers and then returned to the input section of the cell conveyers through the main conveyer and the return conveyer, the variety of products are firstly assembled on the cell conveyers respectively and then conveyed to the main conveyer to be finally assembled, and variety of products are output through an output section of the main conveyer.

Between an output section of the return conveyer and input section of the cell conveyers, a plurality of pallet input devices is disposed. The pallet input devices comprises a first unit conveyer elevatably installed at the output section of the return conveyer, the first unit conveyer for elevating the outputted pallet from the returning conveyer upwardly; a second unit conveyer simultaneously elevated with the first unit conveyer, the second unit conveyer for receiving the pallet elevated by the first unit conveyer therefrom; and a pallet supply conveyer elevatably installed between a lower portion of the second unit conveyer and a front section of the cell conveyers, the pallet supply conveyer for supplying the pallet conveyed to the second unit conveyer to the input section of the cell conveyers.

Between the output section of the cell conveyers and input section of the main conveyer, a plurality of pallet carriers are disposed. The pallet carriers comprises a third unit conveyer moving in an orthogonal direction with respect to a moving direction of the cell conveyers and elevatably installed at the output section of the cell conveyers, the third unit conveyer for elevating the pallet output therefrom; and a fourth unit conveyer moving in a same direction with the third unit conveyer and elevatably installed at the input section of the main conveyer, the fourth unit conveyer for supplying the pallet to the input section of the main conveyer by receiving and de-elevating the pallet elevated by the third unit conveyer.

Here, each of the unit conveyers is elevated by an actuator installed at a lower portion thereof.

Moreover, a reversing apparatus for arranging the product on the pallet conveyed along the main conveyer by reversing the pallet conveyed from one of the cell conveyers is installed at a rear section of the pallet carrier which conveys the pallet from one of the cell conveyers to the main conveyer. The reversing apparatus comprises a reversing table whereon the pallet is positioned; an actuator for elevating the reversing table over the main conveyer; and a rotary actuator for reversing the reversing table elevated by the actuator by 180°.

Furthermore, between the main conveyer and the returning conveyer a pallet returning conveyer is installed. The pallet returning conveyer is selectively connected with a pallet output section of the main conveyer and an input section of the return conveyer by pivoting thereof so as to return the pallet output from the pallet output section of the main conveyer to an input section of the returning conveyer.

As constructed as above, the manufacturing system according to the present invention allows a variety of products to be manufactured by employing each cell conveyer therefor. And on the main conveyer, the completely assembled products are tested for durability, then packaged, and shipped. Accordingly, a variety of products can be manufactured with only one manufacturing system.

BRIEF DESCRIPTION OF THE DRAWINGS

The above object and advantages will be more apparent by describing preferred embodiment in greater detail with reference to the drawings accompanied, in which.

DETAILED DESCRIPTION OF THE PREFERRED EMBODIMENT

Figure 1:
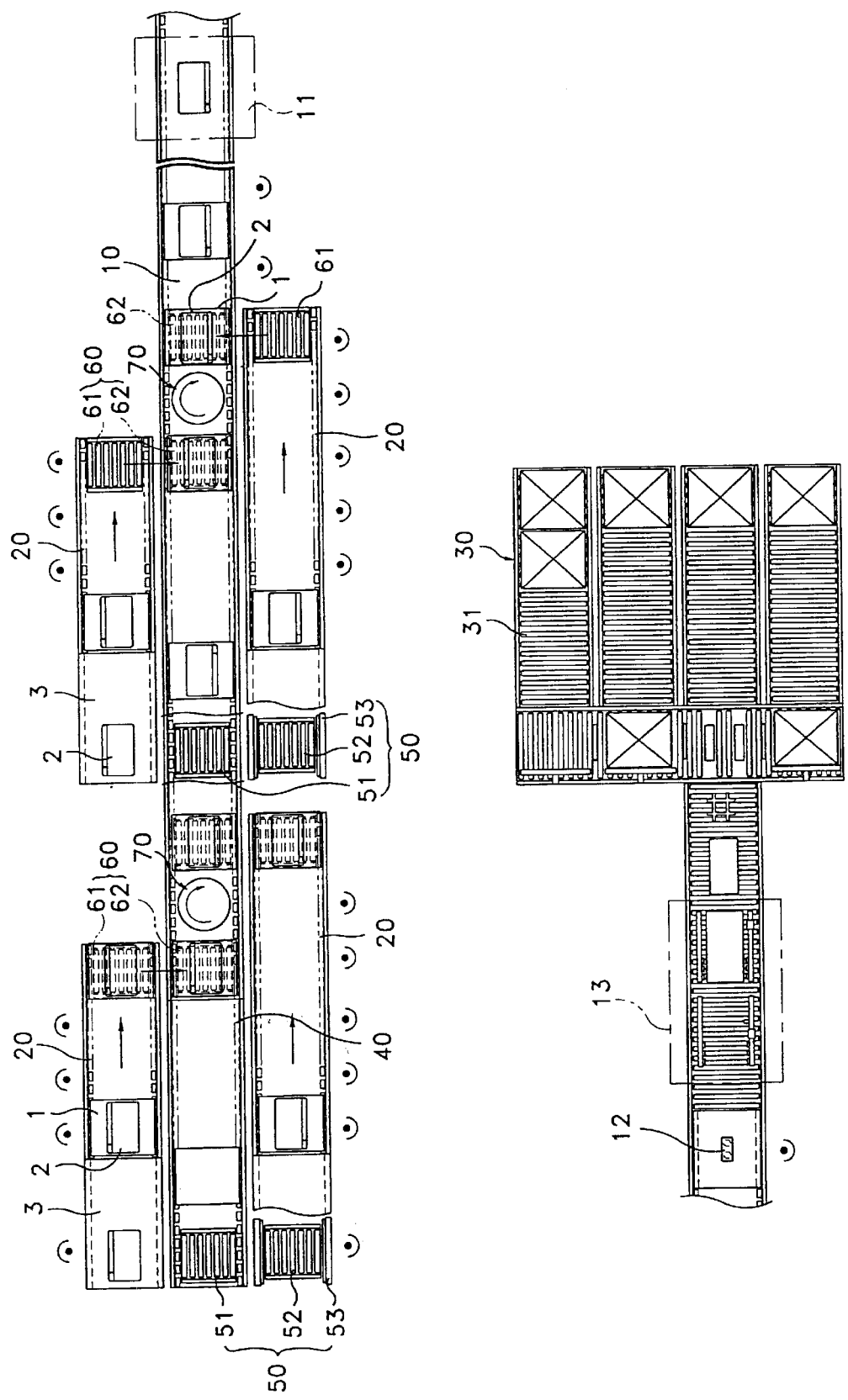
FIG. 1 is a plan view roughly showing a product manufacturing system according to the present invention.

FIG. 1 roughly shows a manufacturing system according to the present invention.

As shown in the drawings, the manufacturing system according to the present invention mainly consists of cell conveyers 20 whereon a product 2 is firstly assembled, a main conveyer 10 whereon the product 2 assembled on the cell conveyers 20 is finally assembled, and a return conveyer 40 for returning a pallet 1 and the product 2 thereon conveyed on the cell conveyers 20 and main conveyer 10 to cell conveyers 20 after the assembly is completed.

Four lines of cell conveyers 20 are installed at the front side part of the main conveyer 10. Four lines of cell conveyers 20 shown in the drawing are based on the preferred embodiment of the present invention, and it means four kinds of products 2 are simultaneously manufactured. However, the number of cell conveyers 20 is not limited, but can be varied according to the number of the kinds of products to be manufactured.

At the rear section of the main conveyer 10, a machine 11 for testing the durability of the product 2, a product elevation device 12 for packaging the product 2 which has passed the durability test, and a stapling and taping machine 13 are installed. A shipping device 30 for forwarding the completely packaged product 2 is installed at the rear section of the main conveyer 10. The shipping device 30 has four lines of shipment conveyers 31 so that packaged products 2 are grouped by kind before being forwarded.

In addition, a return conveyer 40 is installed under the main conveyer 10. The return conveyer 40 is extended from the lower section of the main conveyer 10 at which a product elevation device 12 is installed to a predetermined position of the front section of the main conveyer 10, and moves in the opposite direction with respect to the main conveyer 10.

Also, a product input conveyer 3 for inputting the product 2 to the cell conveyers 20 is installed at the front section of each cell conveyer 20, and a pallet input device 50 is installed between the output section of the return conveyer 40 and input section of each cell conveyer 20.

The pallet input device 50 is used for inputting the pallet 1 returned by the return conveyer 40 to cell conveyers 20 again, and it consists of a first unit conveyer 51, a second unit conveyer 52, and a pallet input conveyer 53. The first unit conveyer 51 is installed at the output section of the return conveyer 40 so that it moves in the orthogonal direction with respect to the moving direction of the return conveyer 40. Also, the second unit conveyer 52 is installed at both sides of the return conveyer 40 where the first unit conveyer 51 is installed, i.e., front lower part of the input section of each cell conveyer 20. The first and second unit conveyers 51 and 52 are simultaneously elevated by actuators 5 which are respectively provided at the lower portion thereof. The pallet input conveyer 53 is elevatably installed between the lower section of the second unit conveyer 52 and the front input section of each cell conveyer 20.

Between the output section of each cell conveyer 20 and each input section of the main conveyer 10, a pallet carrier 60 is disposed. The pallet carrier 60 includes a third unit conveyor, or pallet lifting conveyor, 61 installed at the output section of cell conveyors 20 and having a surface that moves in the orthogonal direction with respect to the moving direction of cell conveyors 20, and a fourth unit conveyor, or pallet lowering conveyor, 62 installed at the input section of the main conveyor 10. The conveyor 62 has a surface moving in the same direction as the surface of the conveyor 61. The third and fourth unit conveyors 61 and 62 are simultaneously elevated by the actuators 5 installed at their lower portions.

Between two pallet carriers 60 for conveying the pallet 1 and the product 2 thereon from the cell conveyers 20 to the main conveyer 10, a reversing device 70 for reversing the product 2 conveyed from cell conveyers 20 is provided. The reversing device 70 consists of a circle-shaped reversing table 71 positioned right behind the pallet carrier 60 which conveys the pallet 1 and the product 2 thereon from cell conveyers 20 to the main conveyer 10, an actuator 72 for elevating the reversing table 71, and a rotary actuator 73 for rotating the reversing table 71.

Additionally, a pallet returning conveyer 80 is installed on a portion of the main conveyer 10 where the product elevation device 12 is installed. The pallet returning conveyer 80 is installed so that its front side can pivot upon the rear side thereof, and it is selectively connected with the main conveyer 10 and the return conveyer 40 installed under the main conveyer 10.

On the other hand, a plurality of stoppers 4 are provided on the pallet input devices 50, pallet carriers 60, and reversing devices 70. The stoppers 4 automatically or selectively stop the conveyed pallet 1.

The operation of the present invention with above-described construction is as follows.

First, the pallet 1 and the product 2 are inputted into the input section of each cell conveyer 20 through product input conveyers 3 and pallet input devices 50.

Figure 2:
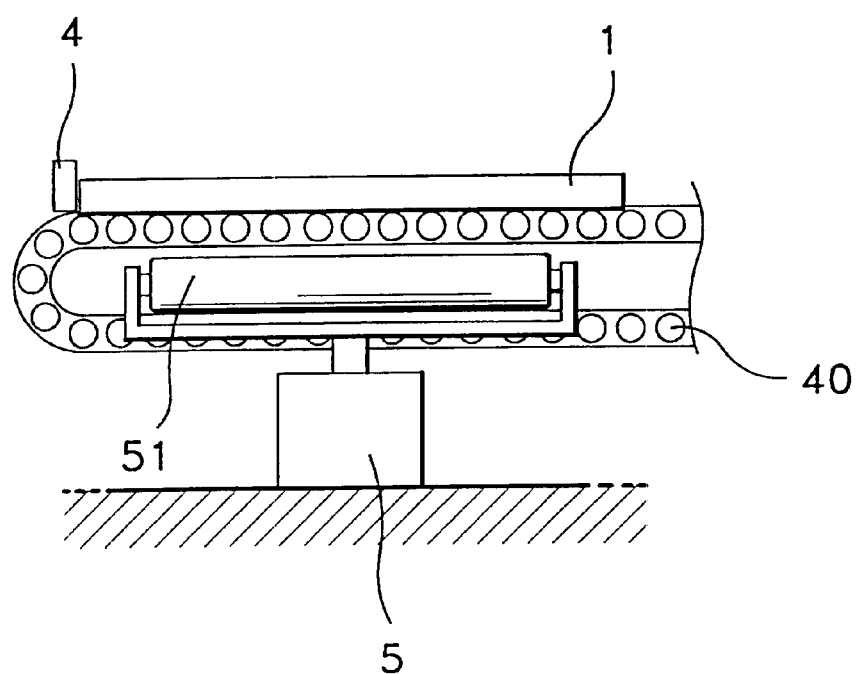
FIG. 2 is a side view showing a first unit conveyer of a pallet input device shown in FIG. 1.
Figure 3:
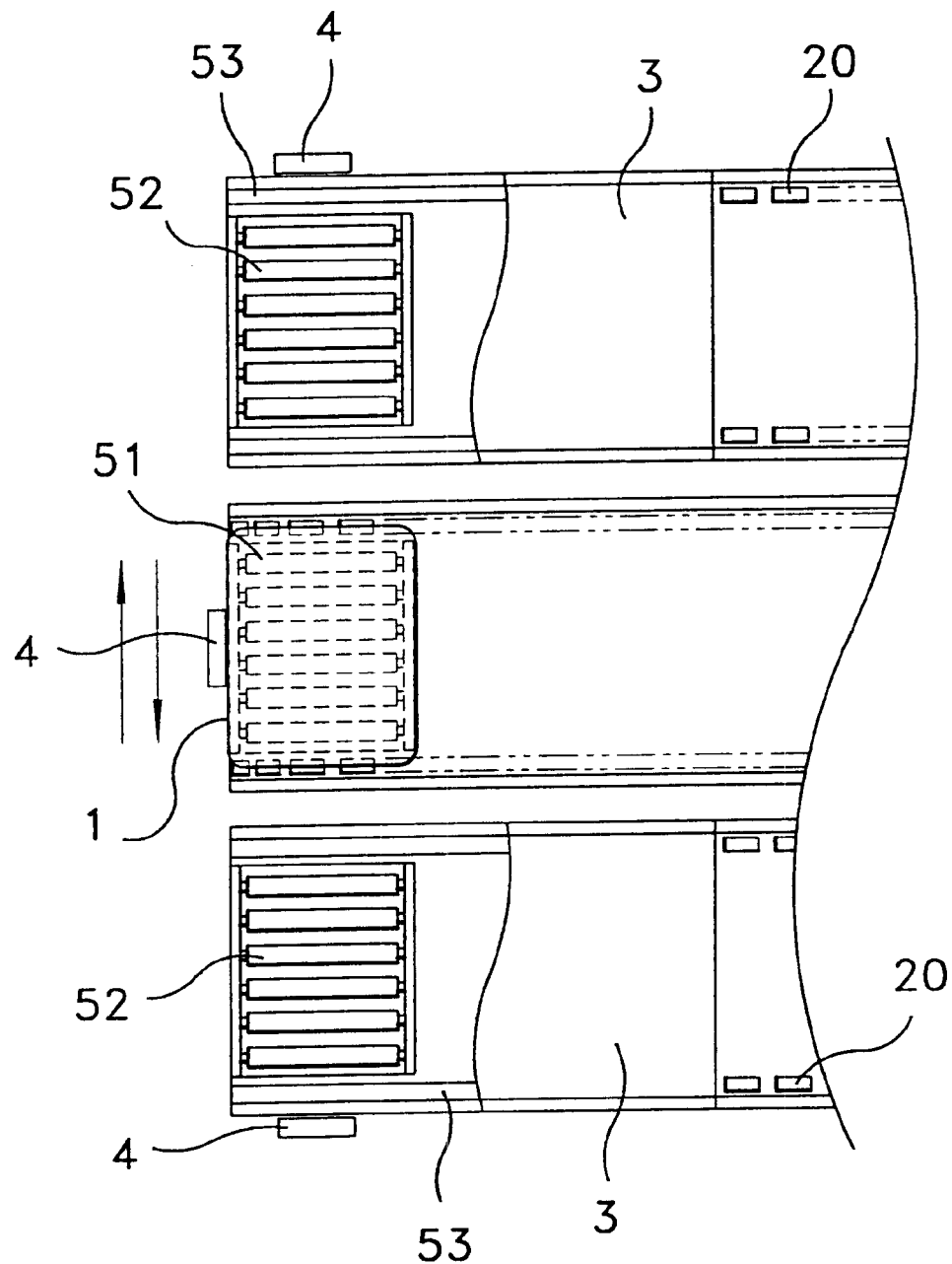
FIG. 3 is a plan view showing the pallet input device shown in FIG. 1 in detail.
Figure 4:
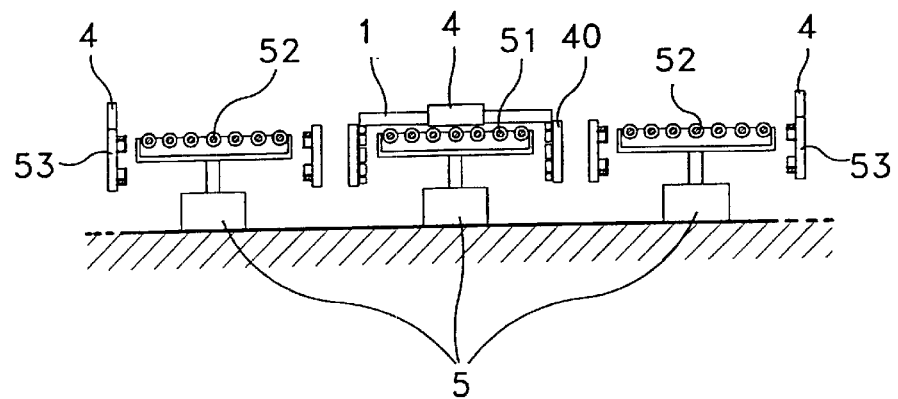
FIGS. 4 through 6 are views showing each operation stage of a pallet input device shown in FIG. 1, wherein a pallet thereon is conveyed from the first unit conveyer to a second unit conveyer
Figure 5:
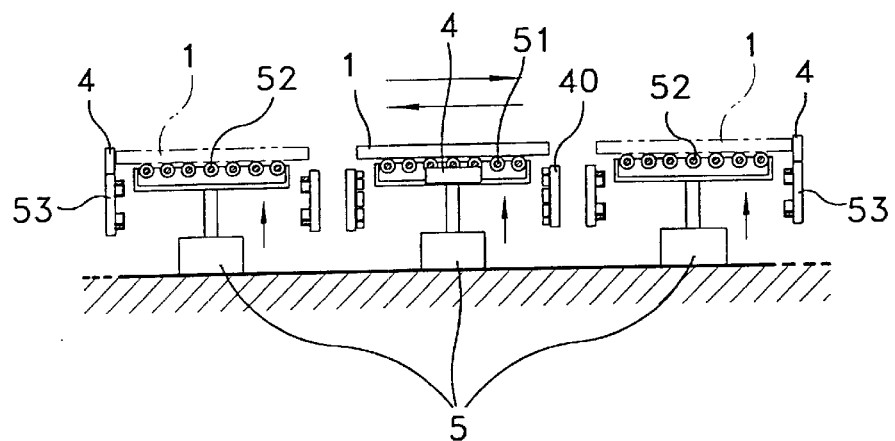
Figure 6:
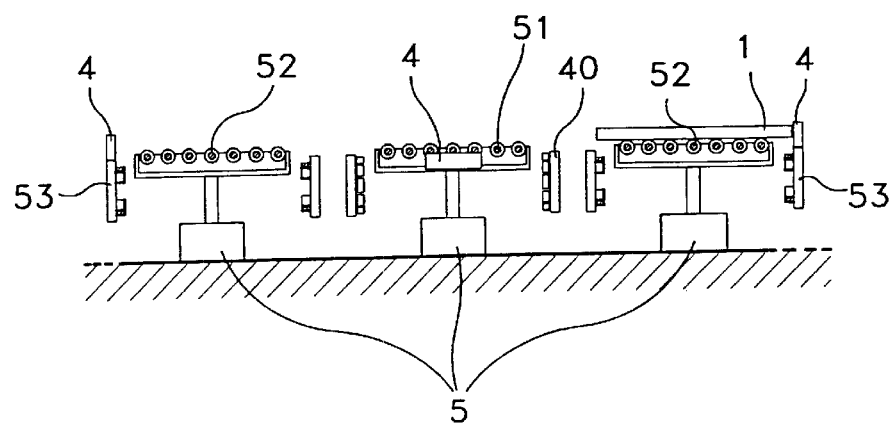
Figure 7:
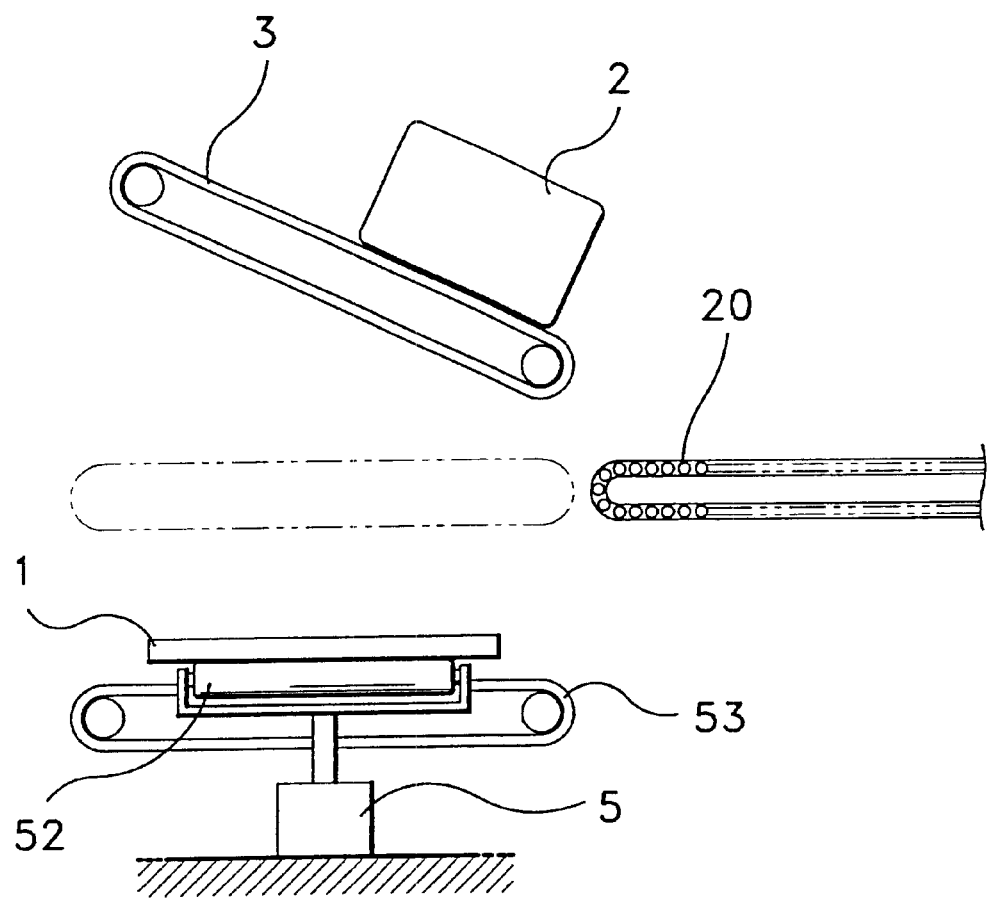
FIGS. 7 through 10 are views showing each operation stage of a pallet input device shown in FIG. 1, wherein a pallet thereon is input from the second unit conveyer to the cell conveyer through the pallet input conveyer.
Figure 8:
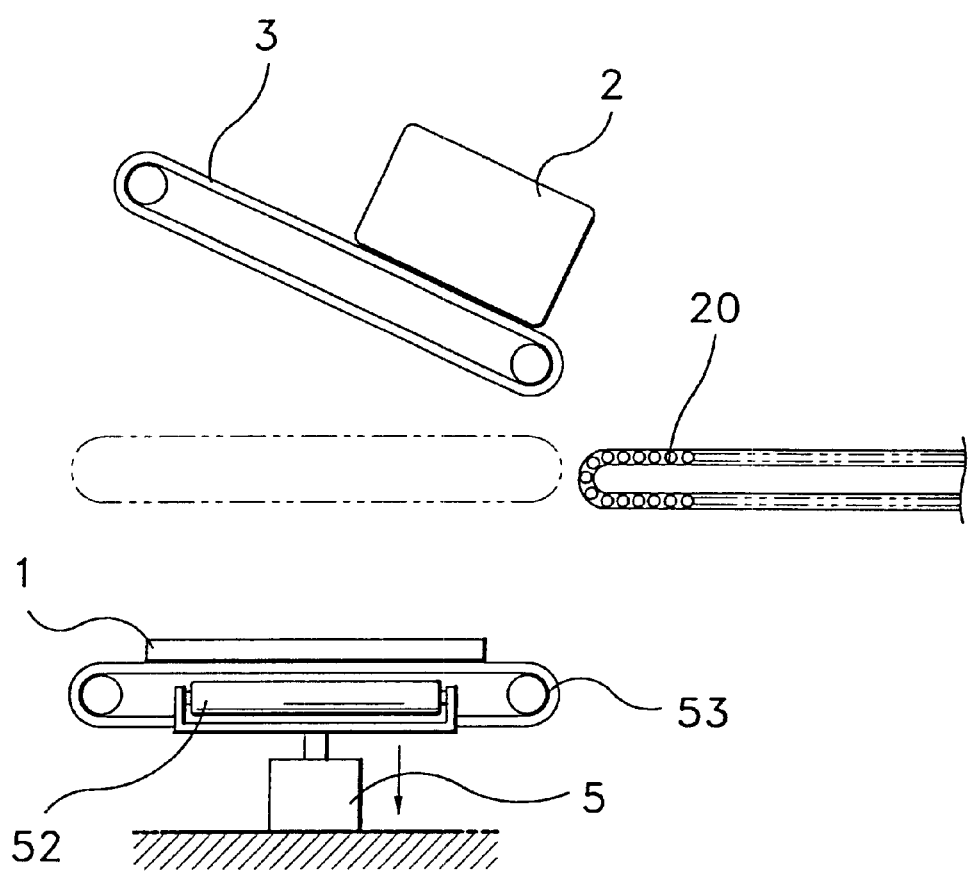
Figure 9:
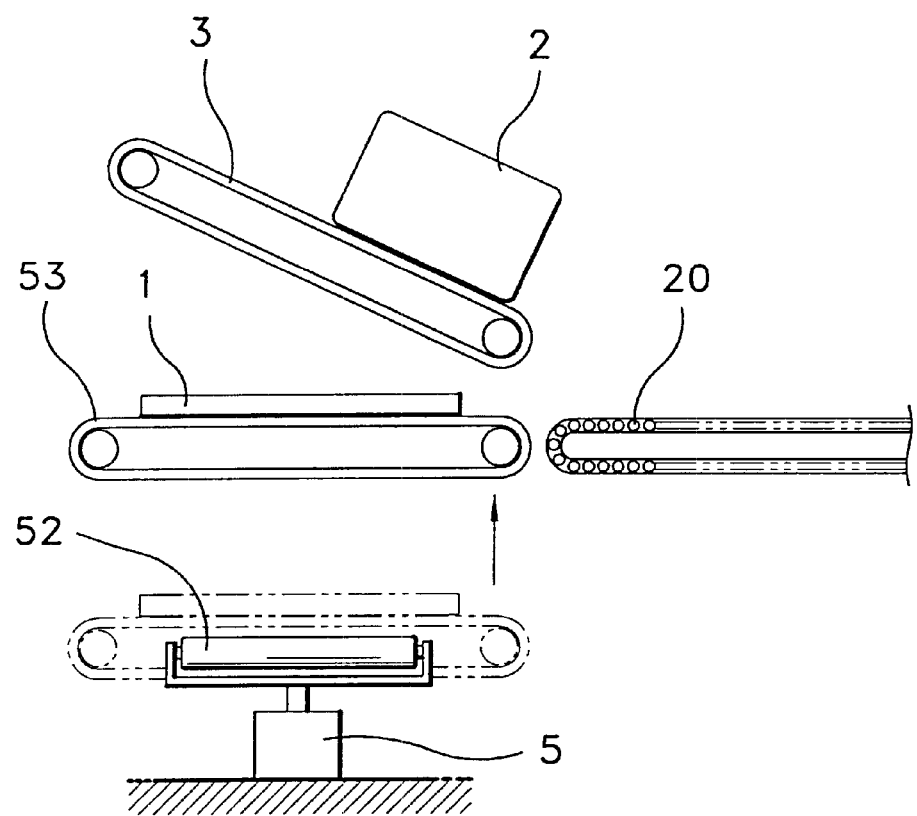
Figure 10:
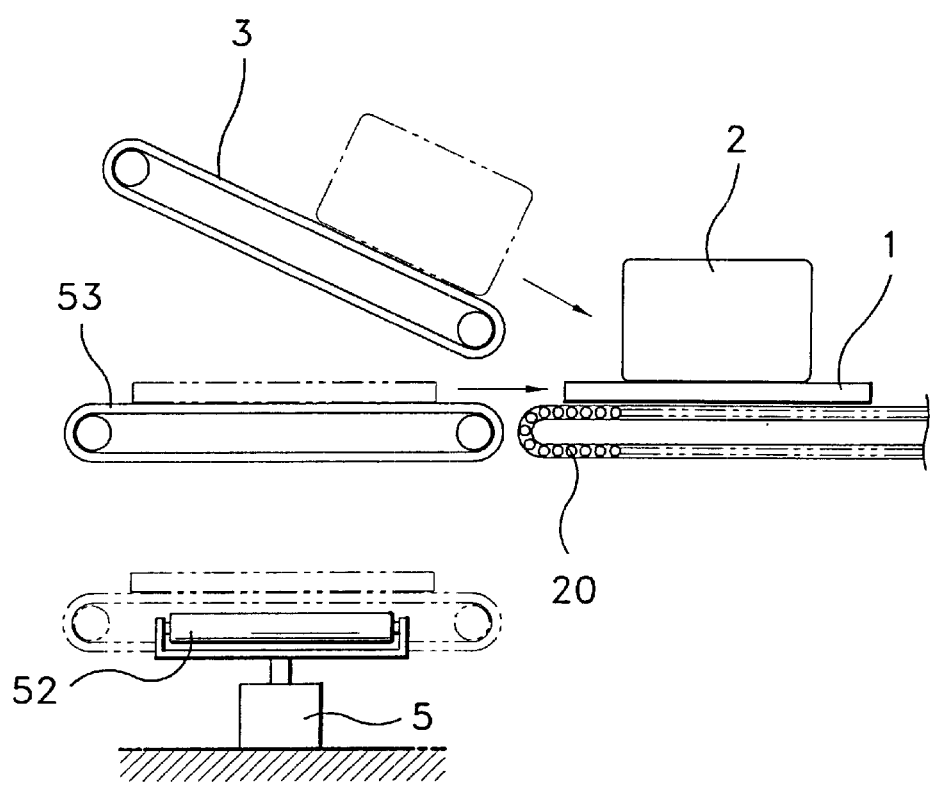
Figure 19:
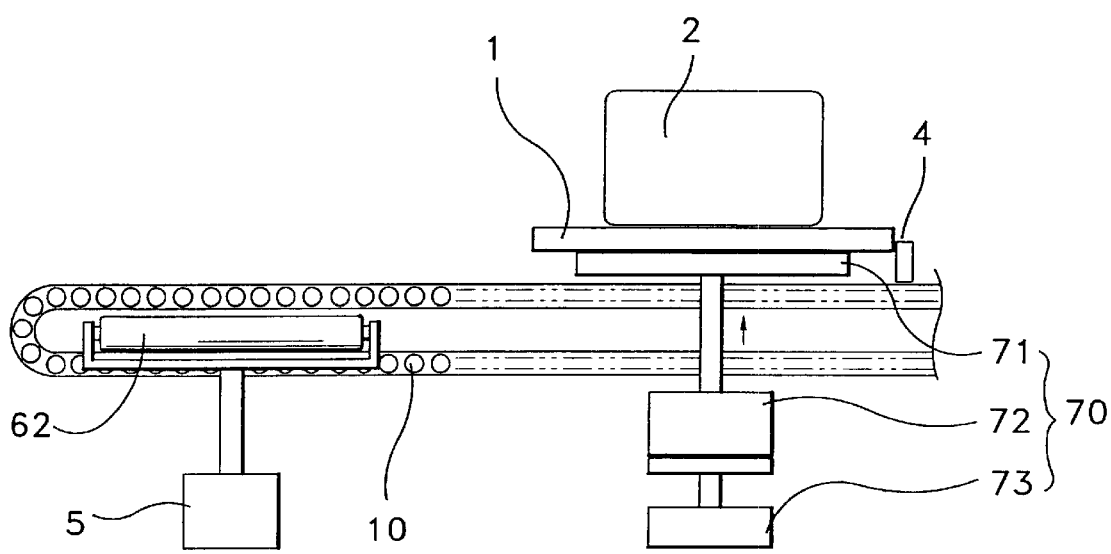

Now, attentions are invited to the operation of the pallet input devices 50 with reference to FIGS. 2 through 10. When the pallet 1 is conveyed to the upper section of the first unit conveyer 51 after being returned by the return conveyer 40, it is stopped by the stopper 4 positioned at the rear section of the first unit conveyer 51. FIGS. 2 through 4 respectively show the pallet 1 conveyed to the upper section of the first unit conveyer 51 with side, upper, and rear view. As shown, when the pallet 1 is conveyed to the upper section of the first unit conveyer 51, the first and the second unit conveyers 51 and 52 are simultaneously elevated by actuators 5 (FIG. 5). Subsequently, the pallet 1 is elevated with the first unit conveyer 51. After the first and second unit conveyers 51 and 52 are completely elevated, they move in the same direction with each other, and the pallet 1 is conveyed to one of two second unit conveyers 52 which are disposed at both sides of the first unit conveyer 51 (FIGS. 6 and 7). When the pallet 1 is conveyed to the second unit conveyer 52 in a described manner, the first and the second unit conveyer 51 and 52 are de-elevated to be back to the initial position. At this instance, the pallet 1 on the second unit conveyer 52 is conveyed to the pallet input conveyer 53 which is orthogonally disposed to the second unit conveyer 52 by the de-elevation of the second unit conveyer 52 (FIG. 8). After that, the pallet input conveyer 53 is elevated up to the same height with the height of the cell conveyers 20 (FIG. 9), and the pallet 1 is input to the cell conveyers 20. In this situation, the product input conveyer 3 installed at the upper section of the pallet input conveyer 53 operates simultaneously so that the product 2 is loaded on the pallet 1 which is input to cell conveyers 20 (FIG. 19).

Then, pallet 1 and the product 2 assembled on each cell conveyer 20 are conveyed to the main conveyer 10 through the pallet carriers 60, and continue to be conveyed on the main conveyer 10.

The conveying process by the pallet carriers 60 are as follows.

Figure 11:
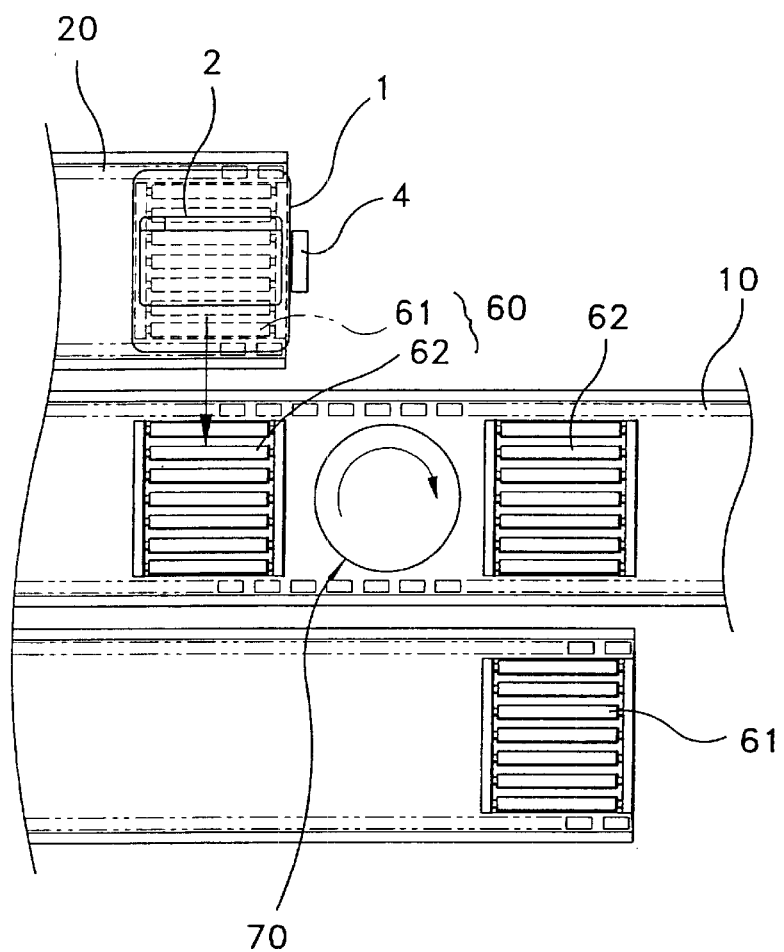
FIGS. 11 through 16 are views showing each operation state of a pallet carrier shown in FIG. 1, wherein a pallet and a product thereon is conveyed from a third unit conveyer to a fourth unit conveyer.
Figure 12:
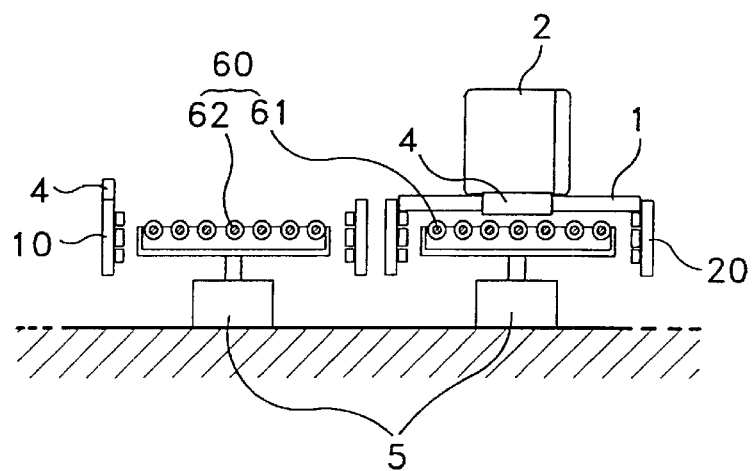
Figure 13:
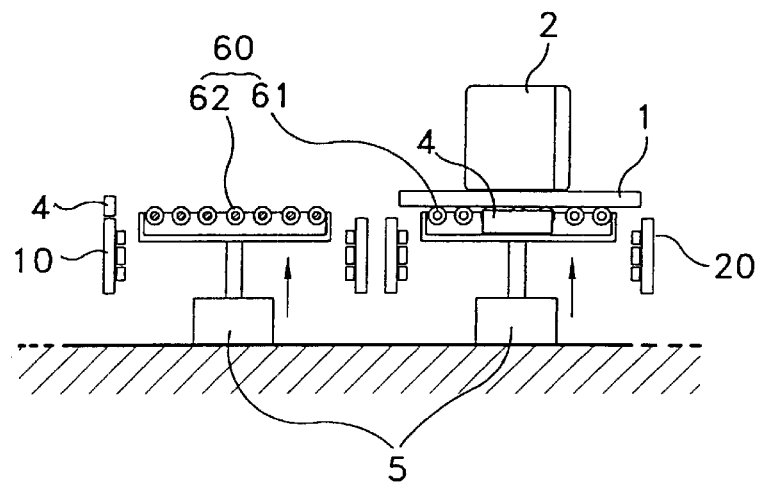
Figure 14:
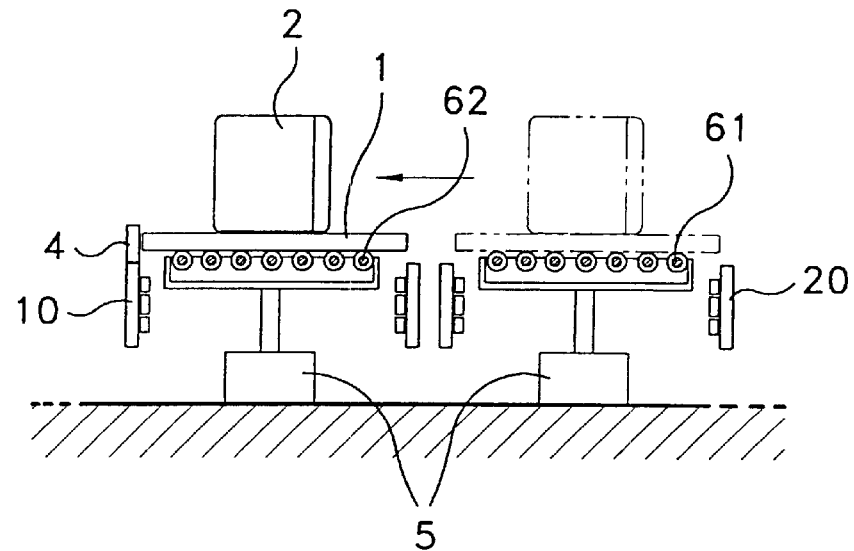
Figure 15:
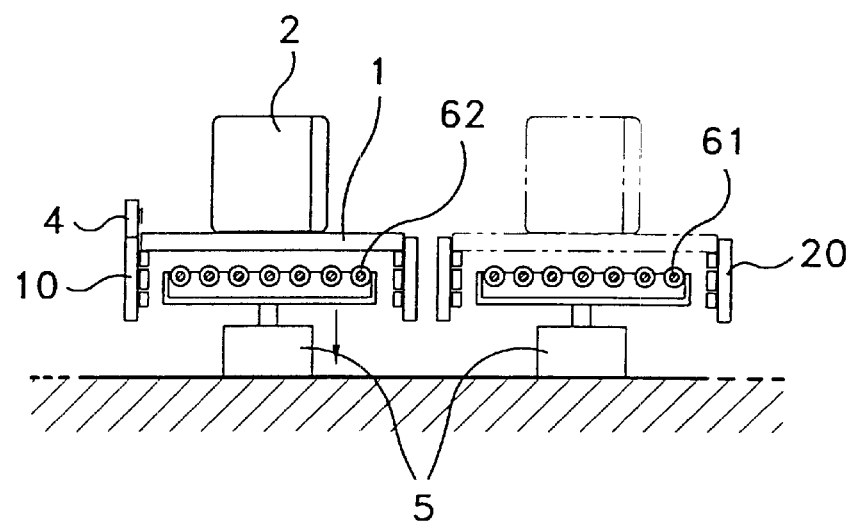
Figure 16:
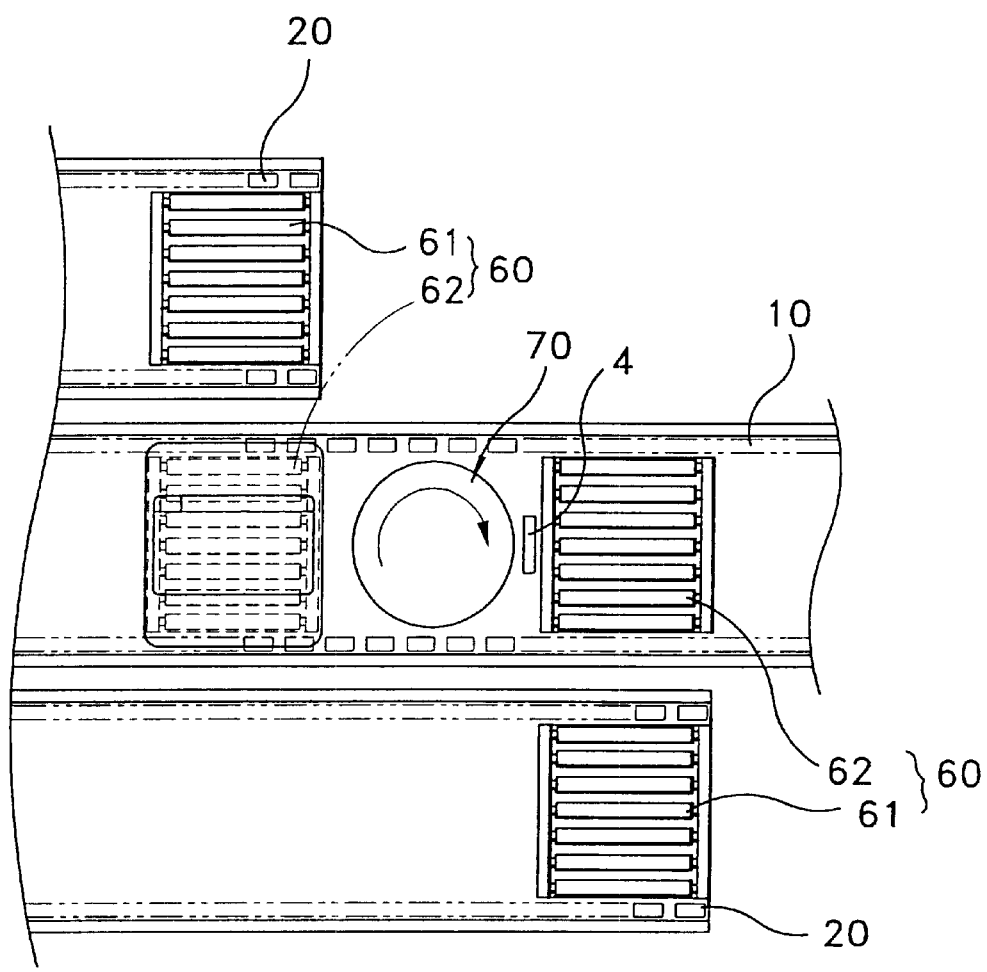

When the product 2 completely assembled on each cell conveyer 20 is stopped by the stoppers 4 at the rear section of the cell conveyer 20 (FIG. 11 or FIG. 12), the third and the fourth unit conveyers 61 and 62 are simultaneously elevated (FIG. 13). At this instance, the pallet 1 and the product 2 thereon are elevated by the third unit conveyer 61. Then, the third and the fourth unit conveyers 61 and 62 move in the same direction with each other, whereby the pallet 1 and the product 2 thereon elevated by the third unit conveyer 61 are conveyed to the fourth unit conveyer 62 until they are stopped by the stopper 4 (FIG. 14). The third and the fourth unit conveyers 62 and 63 are de-elevated again, and thereby, the pallet 1 and the product 2 thereon are positioned on the main conveyer 10 (FIGS. 15 and 16), and conveyed by the main conveyer.

Meanwhile, the workers who assemble the products 2 at the cell conveyers 20 work in positions facing each other. Accordingly, the products 2 assembled at the cell conveyers 20 and then conveyed on the main conveyer 10 are arranged to be opposite to each other.

Figure 17:
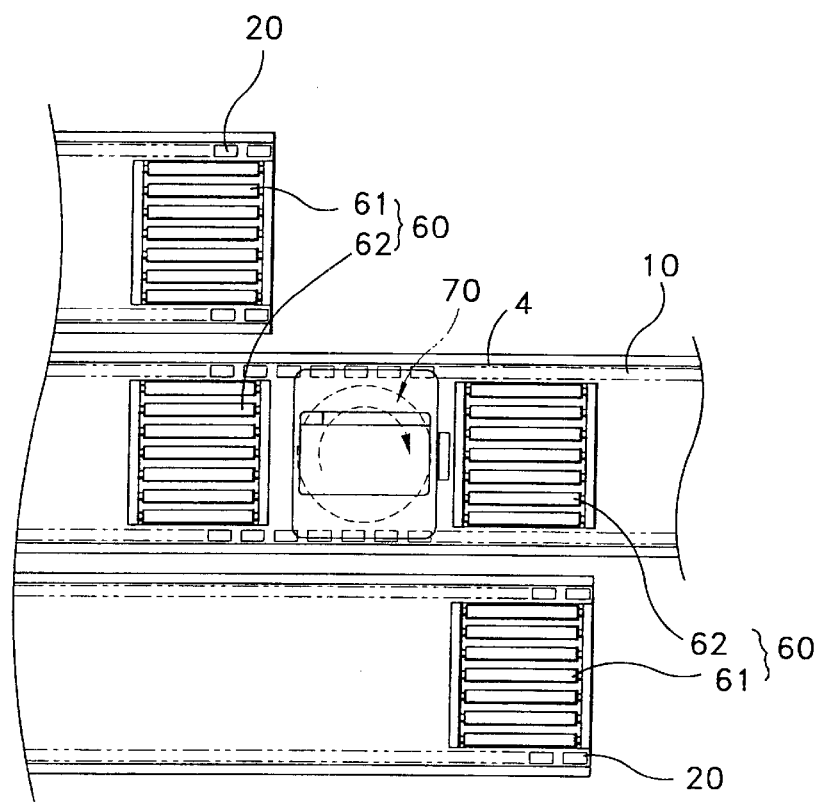
FIGS. 17 through 21 are views showing each operation stage of a reversing device shown in FIG. 1, wherein a pallet and a product thereon are reversed thereby.
Figure 18:
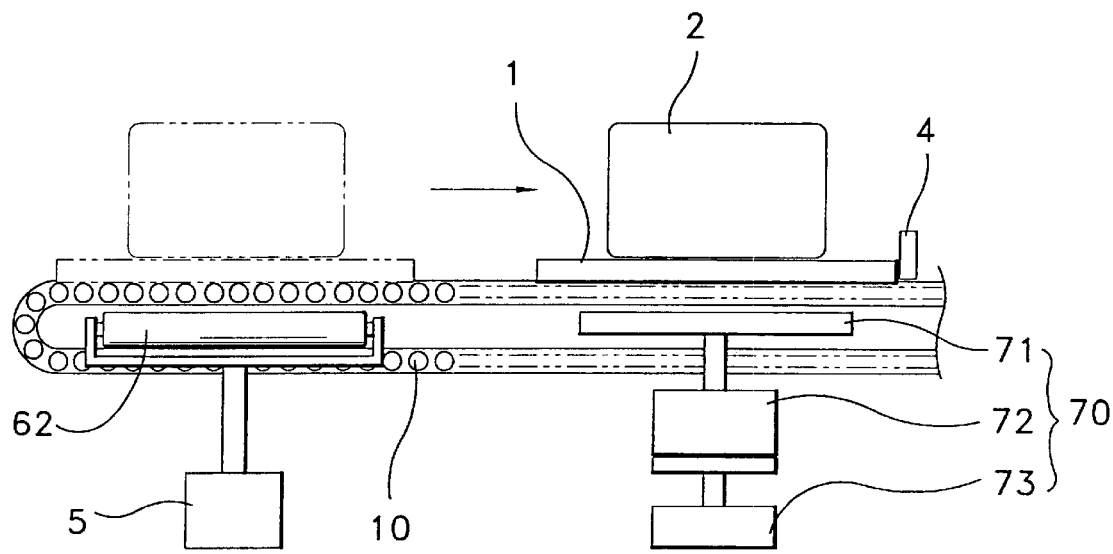
Figure 20:
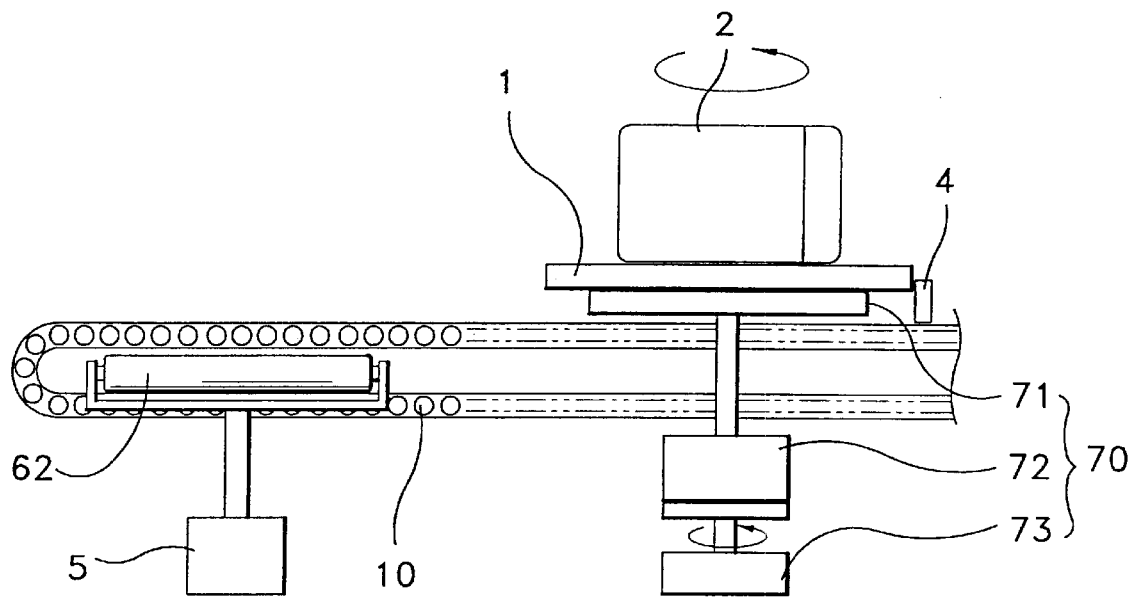
Figure 21:
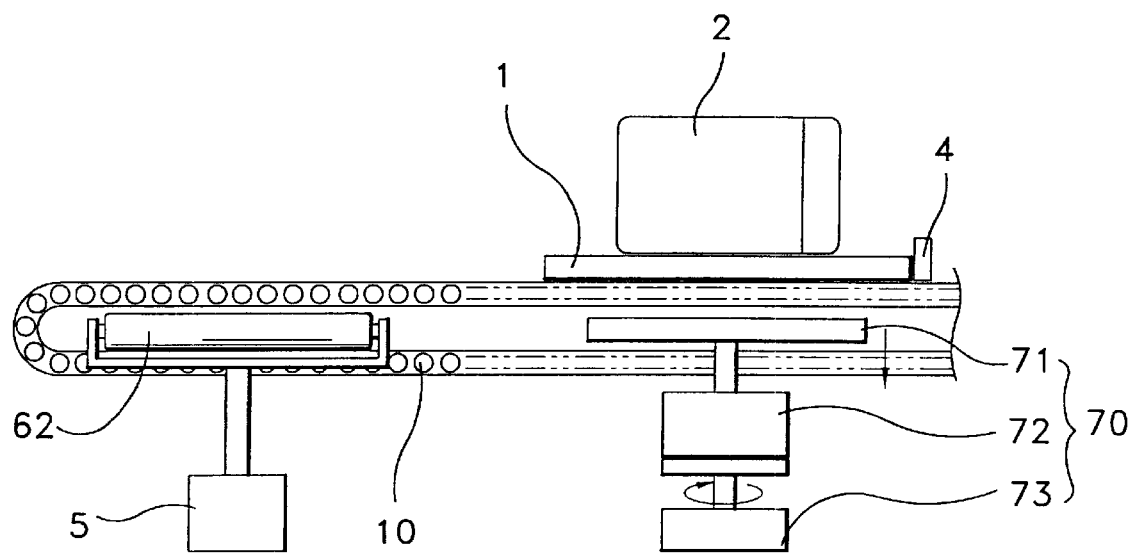

To rearrange all the products 2 to be faced toward the same direction, the product 2 assembled on the cell conveyer 20 reversed by 180° by the reversing device 70. More specifically, when the pallet 1 and the product 2 conveyed by the pallet carrier 60 from one cell conveyer 20 to the main conveyer 10 are stopped by the stopper 4 at the position that the reversing device 70 is installed (FIGS. 17 and 18), the reversing table 71 is elevated by the actuator 72, and thereby the product 2 and the pallet 1 is elevated together while they are positioned on the reversing table 71 (FIG. 19). After the reversing table 71 is completely elevated, the rotary actuator 73 operates to reverse the reversing device 71 by 180° FIG. 20). After being reversed, the reversing table 71 is de-elevated by the actuator 72, and then the product 2 and the pallet 1 are conveyed onto the main conveyer 10 with being reversed, and conveyed by the main conveyer 10 again (FIG. 21). The reversing table 71 is returned to ins initial position by the rotary actuator after being completely de-elevated.

After that, the product 2 conveyed on the main conveyer 10 is tested for durability by the testing machine 11. The testing machine 11 is equipped with a plurality of power supply devices so as to conduct durability tests upon a variety of products 2 assembled from all cell conveyers 20. The detailed description of the constitution and the operation of such a testing machine is disclosed in Korean Patent application no. 96-31497 (title: Power supply devices of durability testing system of a microwave oven) which was submitted by the applicant of this application.

The product 2 which has passed the durability test is now packaged. The packaging process includes a step of encasing the product 2 with the carton 6 after elevating the product 2 upwardly by the product elevation device 12, and a step of stapling and taping the product 2 by the stapling and taping machine 13.

Figure 22:
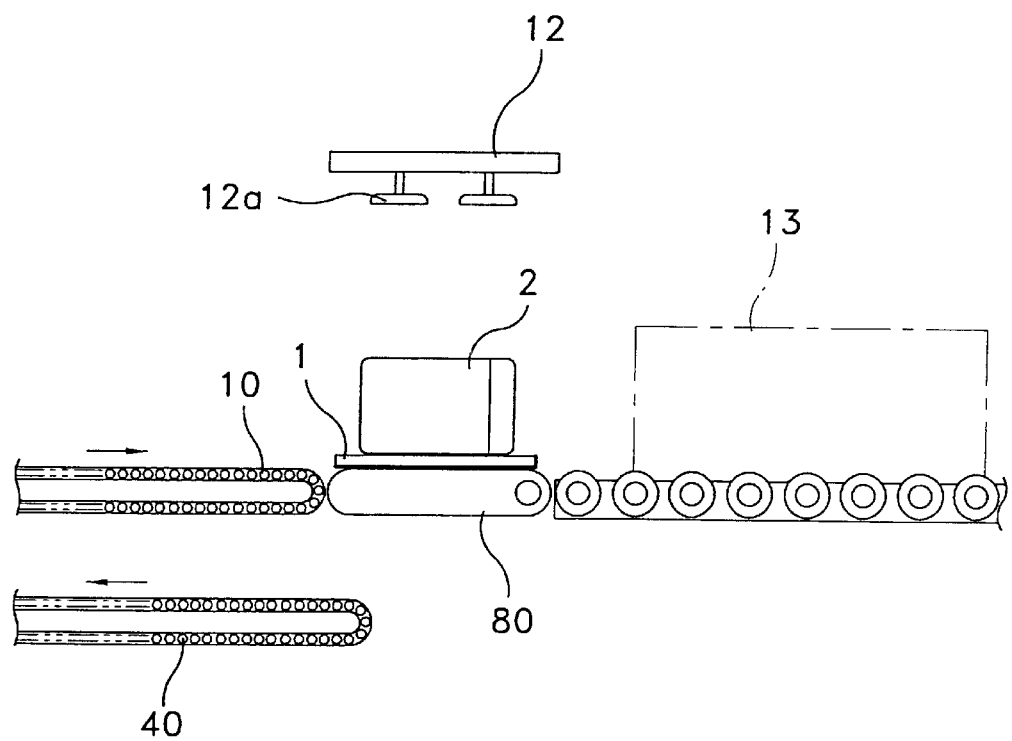
FIGS. 22 through 27 are views showing the stage that pallet is returned to a return conveyer by a pallet returning conveyer shown in FIG. 1.
Figure 23:
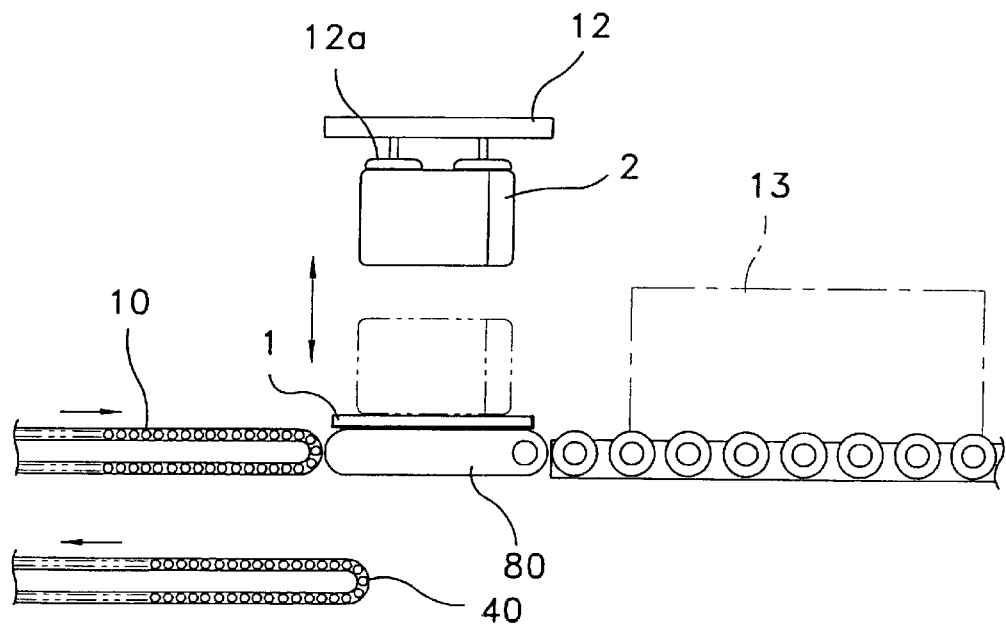
Figure 24:
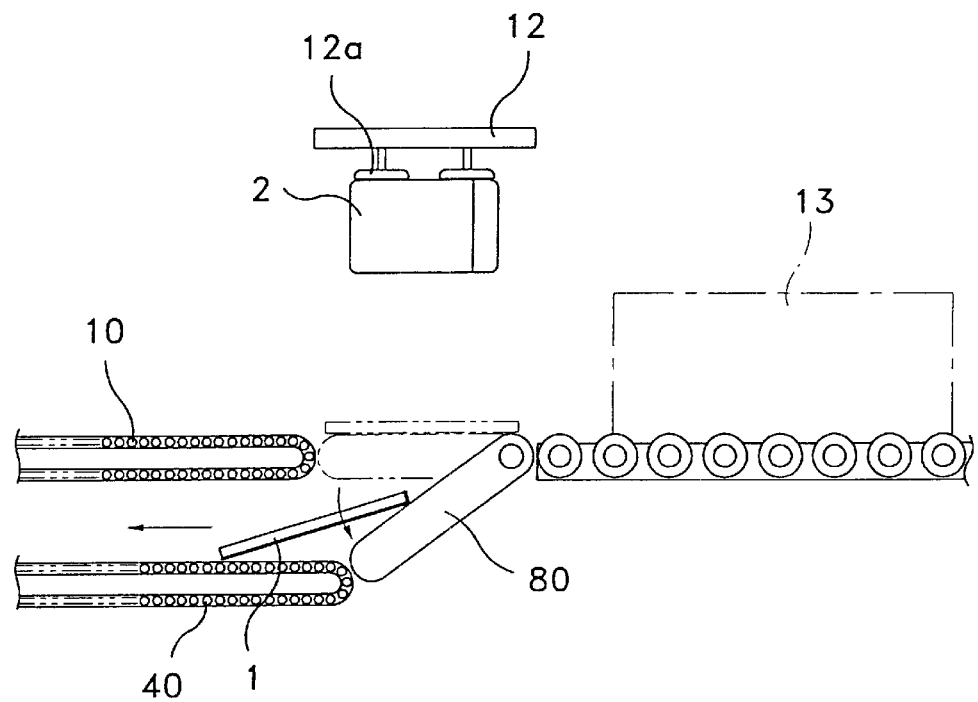
Figure 25:
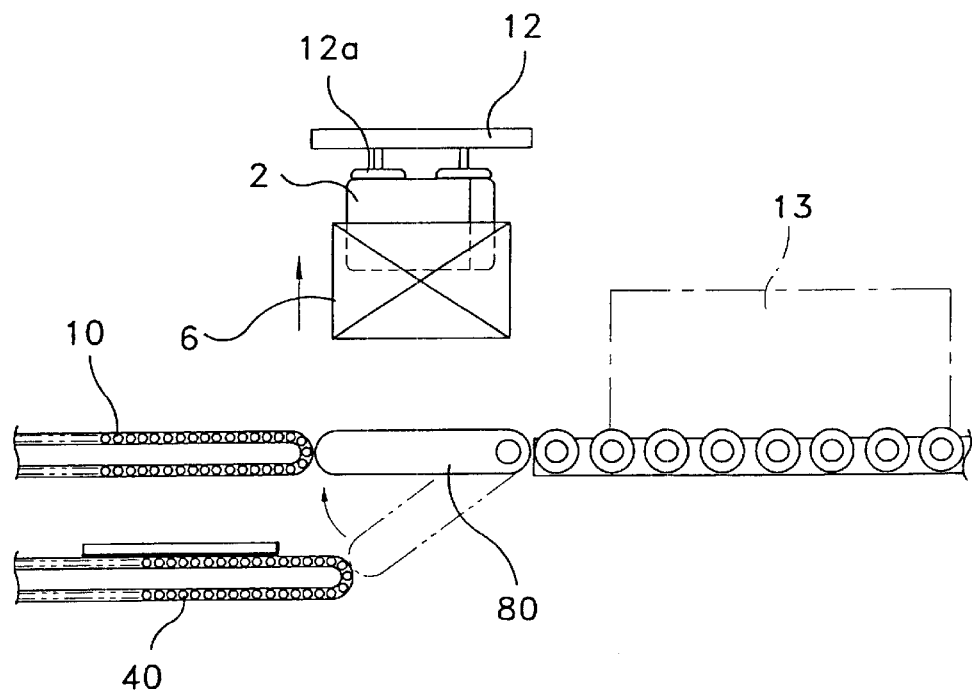
Figure 26:
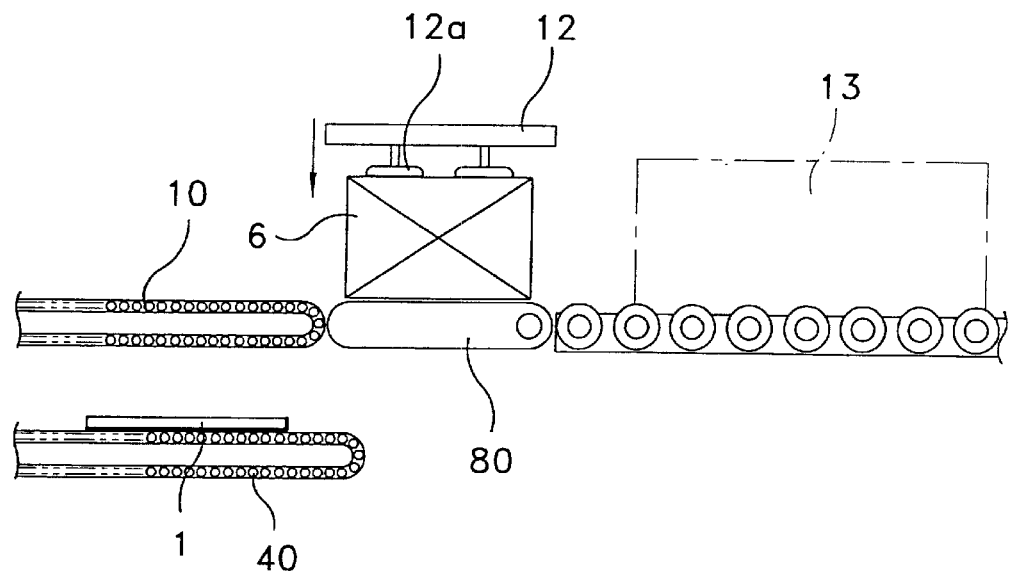
Figure 27:
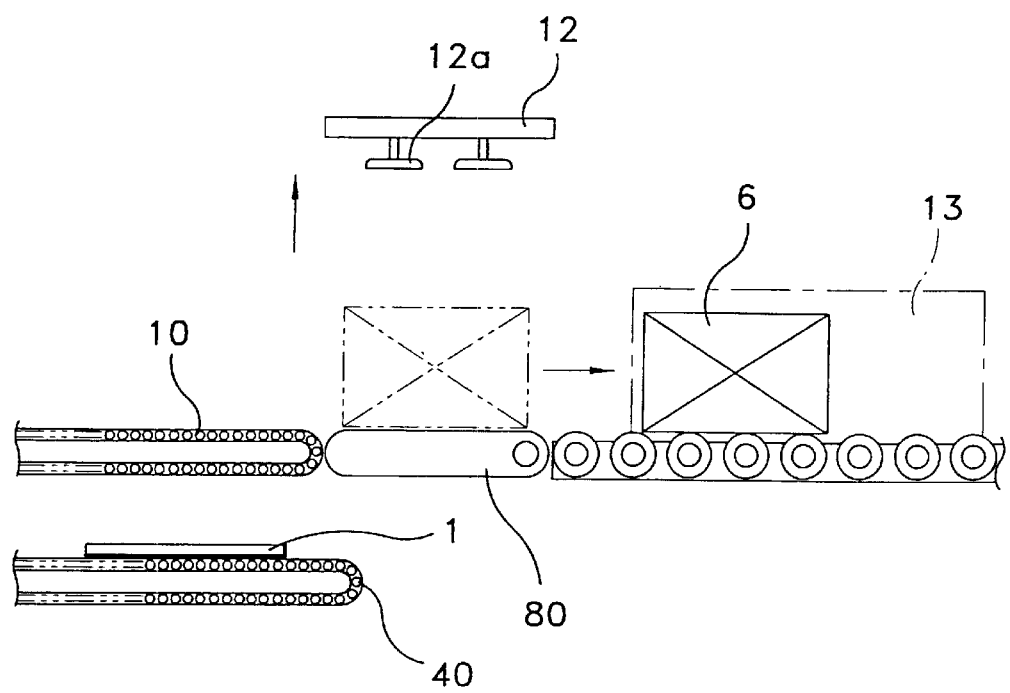

During the step of encasing the product 2 with the carton 6, the pallet 1 which has been loaded with the product 2 and conveyed along the cell conveyer 20 and the main conveyer 10 is returned to the return conveyer 40 by the pallet returning conveyer 80 installed at the lower portion of the product elevation device 12. More specifically, when the product 2 which has undergone the assembling process and the durability test is conveyed to the pallet returning conveyer 80 (FIG. 22), the product 2 is elevated by the product elevation device 12. That is, the vacuum pad 12a of the product elevation device 12 is adhered to the upper surface of the product 2 so that the product elevation device 12 elevates the product 2 (FIG. 23). When the product 2 is elevated, the pallet returning conveyer 80 pivots downward so that the front side thereof is connected with the return conveyer 40. Then, the pallet returning conveyer 80 moves in the opposite direction with respect to the previous direction, so that the pallet 1 is returned to the return conveyer 40 (FIG. 24). After the pallet 1 is returned to the return conveyer 40, the pallet returning conveyer 80 pivots upward to return to the initial position again. At this instance, the packaging worker encase the carton 6 onto the product 2 which has been elevated by the product elevation device 12 (FIG. 25). After the product 2 is encased with the carton 6, the product 2 is now de-elevated onto the pallet returning conveyer 80 (FIG. 26). After that, the product 2 in the carton 6 which has been picked up by the vacuum pad 12a is released from the product elevation device 12 as the vacuum pad 12a releases vacuum pressure, and then conveyed to the stapling and taping machine 13 where the packaging process is completed (FIG. 27).

As described above, the pallet 1 returned to the return conveyer 40 is again returned to the pallet input device along the return conveyer 40, and is input to cell conveyers 20.

In addition, the product 2 that has completed the packaging process is conveyed to the shipment device 30 for grouping the products 2, and then shipped by each corresponding shipping conveyer 31.

As describe above, a variety of products are assembled on a plurality of cell conveyers 20 installed beside the main conveyer 10, and the durability testing process, packaging process, and the shipping process are performed on the main conveyer 10.

Accordingly, productivity is substantially improved with the manufacturing system capable of manufacturing a variety of products in one assembly line. In addition, even when the products to be manufactured are of a different kind, there is no need to change the whole manufacturing system but just to change some portions of the cell conveyer, so manufacturer can flexibly deal with the changing demand of the product, and thereby, time and money are substantially reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A manufacturing system for assembling a plurality of different models of a product, comprising:
   a main conveyor defining a linear conveying path having first and second sides;
   a plurality of cell conveyors disposed alongside respective ones of the first and second sides and extending substantially parallel to the main conveyor for conveying pallets, each cell conveyor defining an assembly line for assembling a respective one of the plurality of product models from parts, wherein the number of cell conveyors corresponds to the number of different product models, each cell conveyor including an inlet end for receiving the parts from a source independent of the main conveyor, the product models being conveyed on pallets along the respective cell conveyors, each cell conveyor including an output section to which the pallets are conveyed; and a pallet carrier disposed at the output section of each cell conveyor for successively receiving and transferring the pallets from the respective cell conveyor to a respective input section of the main conveyor, the input sections associated with output sections located on the first side of the main conveyor being offset along the conveying path with respect to the input sections associated with output sections located on the second side of the main conveyor; and reserving apparatuses arranged to reverse selected pallets that are transferred to the main conveyor by the selected pallet carriers, at least one of the reversing apparatuses located between: a first input section which receives pallets from a cell conveyor disposed alongside said first side, and a second input section which receives pallets from a cell conveyor disposed alongside said second side.

* * * * *